(12) United States Patent
Kozaki

(10) Patent No.: US 8,991,818 B2
(45) Date of Patent: Mar. 31, 2015

(54) SHEET CONVEYOR DEVICE

(71) Applicant: Daisuke Kozaki, Nagoya (JP)

(72) Inventor: Daisuke Kozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,962

(22) Filed: Sep. 27, 2013

(65) Prior Publication Data

US 2014/0151952 A1 Jun. 5, 2014

(30) Foreign Application Priority Data

Nov. 30, 2012 (JP) ................................. 2012-262488

(51) Int. Cl.
| | | |
|---|---|---|
| B65H 31/00 | (2006.01) | |
| B65H 3/06 | (2006.01) | |
| B65H 29/52 | (2006.01) | |
| G03G 15/00 | (2006.01) | |
| H04N 1/00 | (2006.01) | |

(52) U.S. Cl.
CPC ................. *B65H 3/06* (2013.01); *B65H 29/52* (2013.01); *G03G 15/60* (2013.01); *H04N 1/00631* (2013.01); *H04N 1/00976* (2013.01); *B65H 2301/5133* (2013.01); *B65H 2404/612* (2013.01); *B65H 2801/39* (2013.01); *H04N 2201/0081* (2013.01)

USPC ............................ 271/208; 271/264; 361/214

(58) Field of Classification Search
CPC .............................................. B65H 2301/5133
USPC .......... 271/208, 264, 3.14, 225; 361/212, 214
See application file for complete search history.

(56) References Cited

U.S. PATENT DOCUMENTS

| | | | | |
|---|---|---|---|---|
| 4,130,852 A | * | 12/1978 | Peffer et al. | .................... 361/213 |
| 2005/0281598 A1 | * | 12/2005 | Hattori et al. | .................. 399/405 |

FOREIGN PATENT DOCUMENTS

| | | | | |
|---|---|---|---|---|
| JP | 2001-335177 A | | 12/2001 | |
| JP | 2002008890 A | * | 1/2002 | |
| JP | 2008201508 A | * | 9/2008 | |
| JP | 4941493 B2 | | 5/2012 | |

* cited by examiner

*Primary Examiner* — Luis A Gonzalez
(74) *Attorney, Agent, or Firm* — Banner & Witcoff, Ltd.

(57) ABSTRACT

A sheet conveyor device includes a conveyor that conveys a sheet along a conveyance path in a conveying direction, a sheet stack portion that receives the sheet conveyed by the conveyor, and a conducting member. The conveyor includes an ejection roller that ejects the sheet to the sheet stack portion. The conducting member includes a contact portion, disposed along the conveyance path downstream of the ejection roller, which comes into contact with the sheet conveyed by the conveyor, and a discharge portion that discharges static electricity transferred to the contact portion by contact between the sheet and the contact portion.

20 Claims, 11 Drawing Sheets

SHEET CONVEYOR DEVICE

CROSS-REFERENCE TO RELATED APPLICATION

This application claims priority from Japanese Patent Application No. 2012-262488, filed on Nov. 30, 2012, which is incorporated herein by reference.

FIELD OF DISCLOSURE

Aspects disclosed herein relate to a sheet conveyor.

BACKGROUND

A known sheet conveyor includes a processing portion that is configured to perform processing on a sheet, a sheet stack portion where one or more sheets on which processing has been performed by the processing portion are stacked, and a conveyor device that is configured to convey a sheet along a conveyance path that directs the sheet to the processing portion and then further directs the sheet to the sheet stack portion. The conveyor device includes an ejection roller. The ejection roller conveys a sheet being conveyed along the conveyance path, to the sheet stack portion. The sheet conveyor includes a guide surface. The guide surface is disposed downstream of the ejection roller in the conveyance path. The guide surface directs the sheet toward the sheet stack portion while contacting the sheet being conveyed.

SUMMARY

In the known sheet conveyor, static electricity generated by the conveyance of the sheet may move from the sheet to the guide surface and build up on the guide surface and/or in the sheet conveyor. When such a case occurs, static electricity may attract dust to the processing portion to degrade processing quality and/or a sheet stacking failure may occur due to a sheet to be conveyed sticking to the sheet stack portion and a sheet already outputted to the sheet stack portion through static electricity in the sheet conveyor.

Accordingly, aspects disclosed herein provide for a sheet conveyor that restricts or reduces degradation of processing quality in a processing portion and occurrence of a sheet stacking failure on a sheet stack portion due to buildup of static electricity.

According to aspects of the disclosure, in a sheet conveyor, static electricity generated by the sheet conveyance may be prevented from substantially building up on the first guide surface and/or in the sheet conveyor. Thus, in the sheet conveyor, an occurrence of a problem, for example, attraction of dust to the processing portion through static electricity and/or a sheet to be ejected sticking to the sheet stack portion and a sheet already ejected to the sheet stack portion through static electricity, may be restricted or reduced.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION

First, second, and third illustrative embodiments in which aspects of the disclosure are implemented are described in detail with reference to the accompanying drawings, like numerals being used for like corresponding parts in the various drawings.

Figure 1:
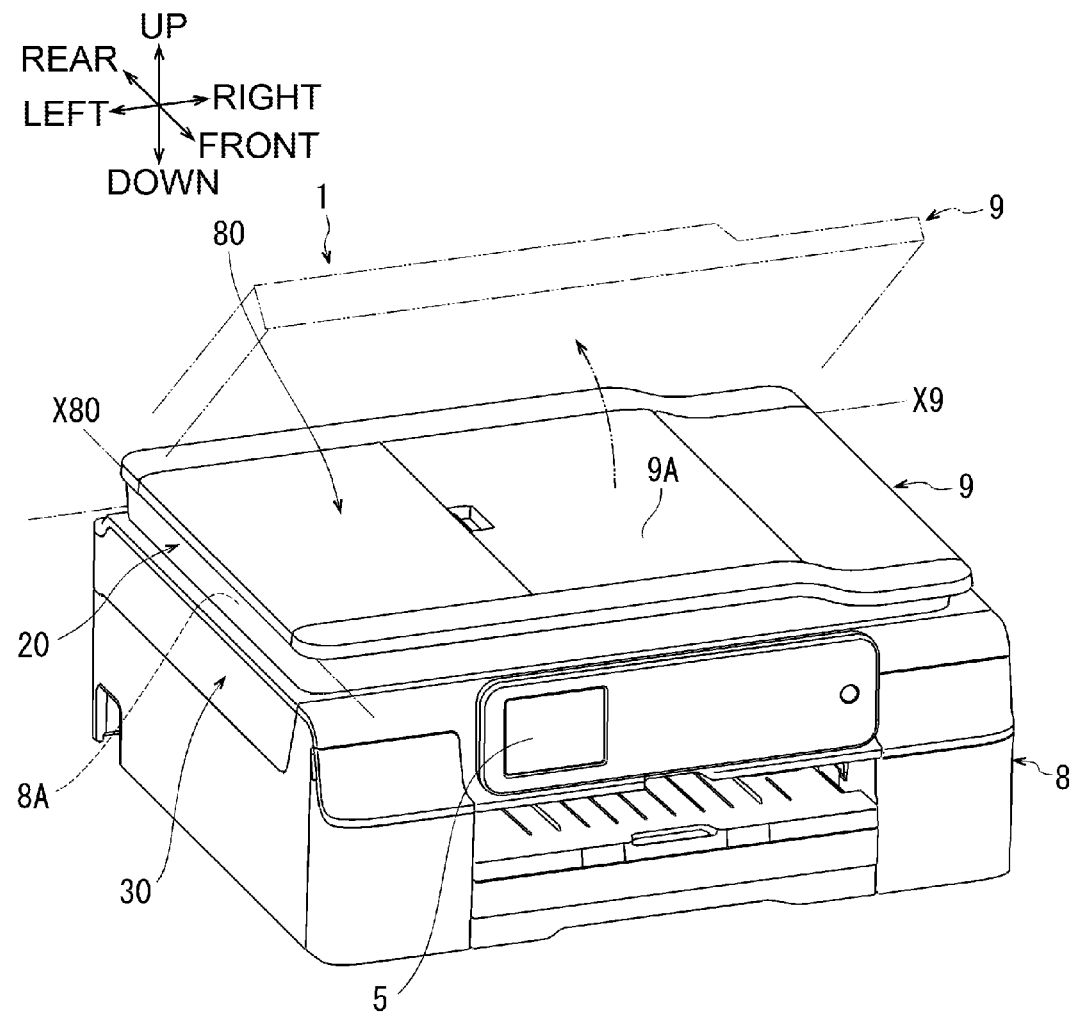
FIG. 1 is a perspective view depicting an image reader in a first illustrative embodiment according to one or more aspects of the disclosure.

Hereinafter, the first illustrative embodiment is described. As depicted in FIG. 1, an image reader 1 may be an example of a sheet conveyor. In FIG. 1, a side of the image reader 1, in which a control panel 5 may be disposed, may be defined as the front of the image reader 1. A side of the image reader 1 facing the left-hand side may be defined as the left of the image reader 1 as viewed from the control panel 5. A front-rear direction, a right-left direction, and an up-down direction may be defined with reference to the front and the left of the image reader 1. Directions indicated in FIGS. 2 to 11 correspond to the directions indicated in FIG. 1, respectively. Hereinafter, referring to FIG. 1, components of the image reader 1 will be described.

Figure 2:
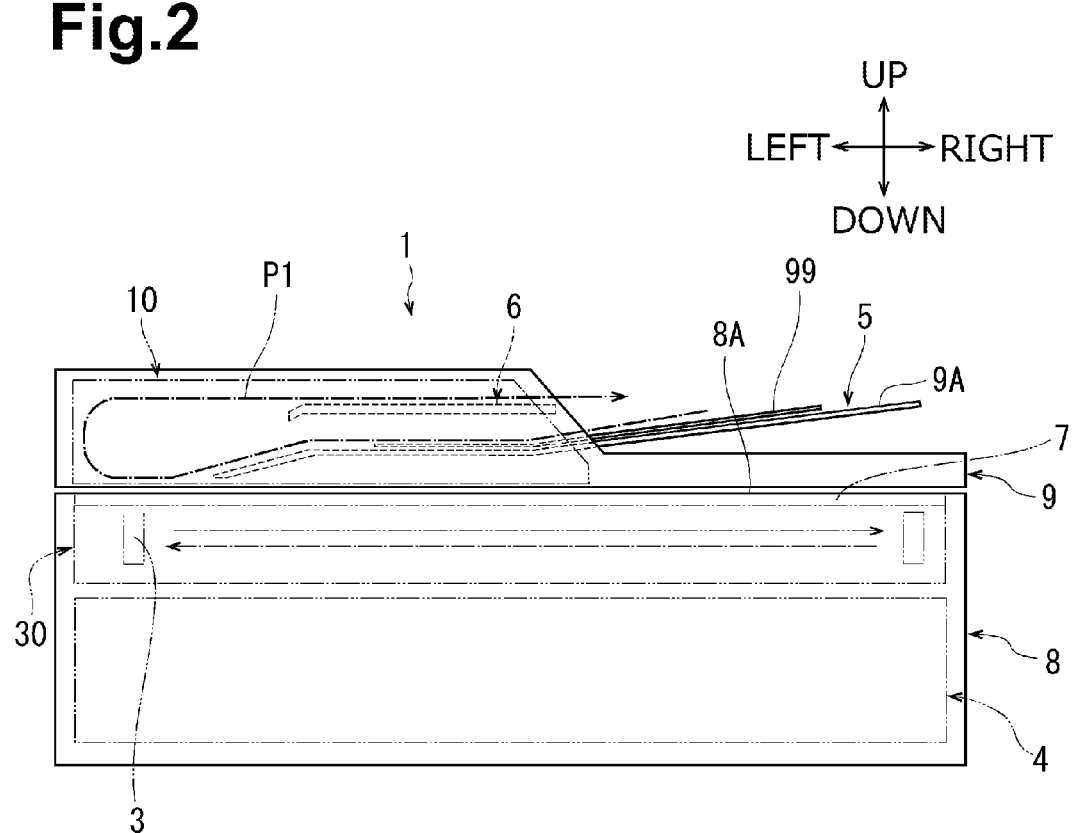
FIG. 2 is a schematic side view depicting the image reader in the first illustrative embodiment according to one or more aspects of the disclosure.
Figure 3:
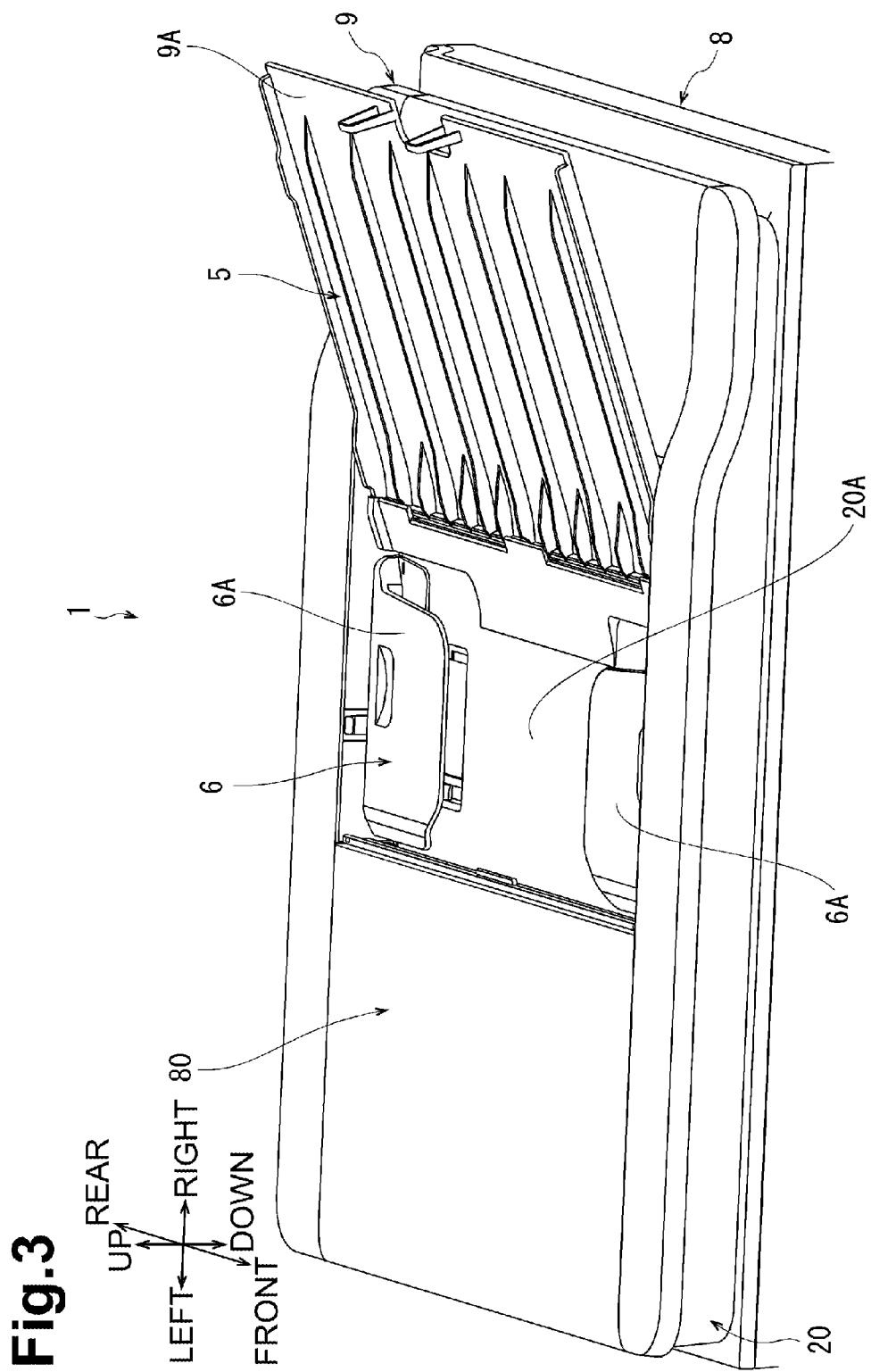
FIG. 3 is a partial perspective view depicting the image reader in the first illustrative embodiment according to one or more aspects of the disclosure, wherein a document mount is opened.
Figure 4:
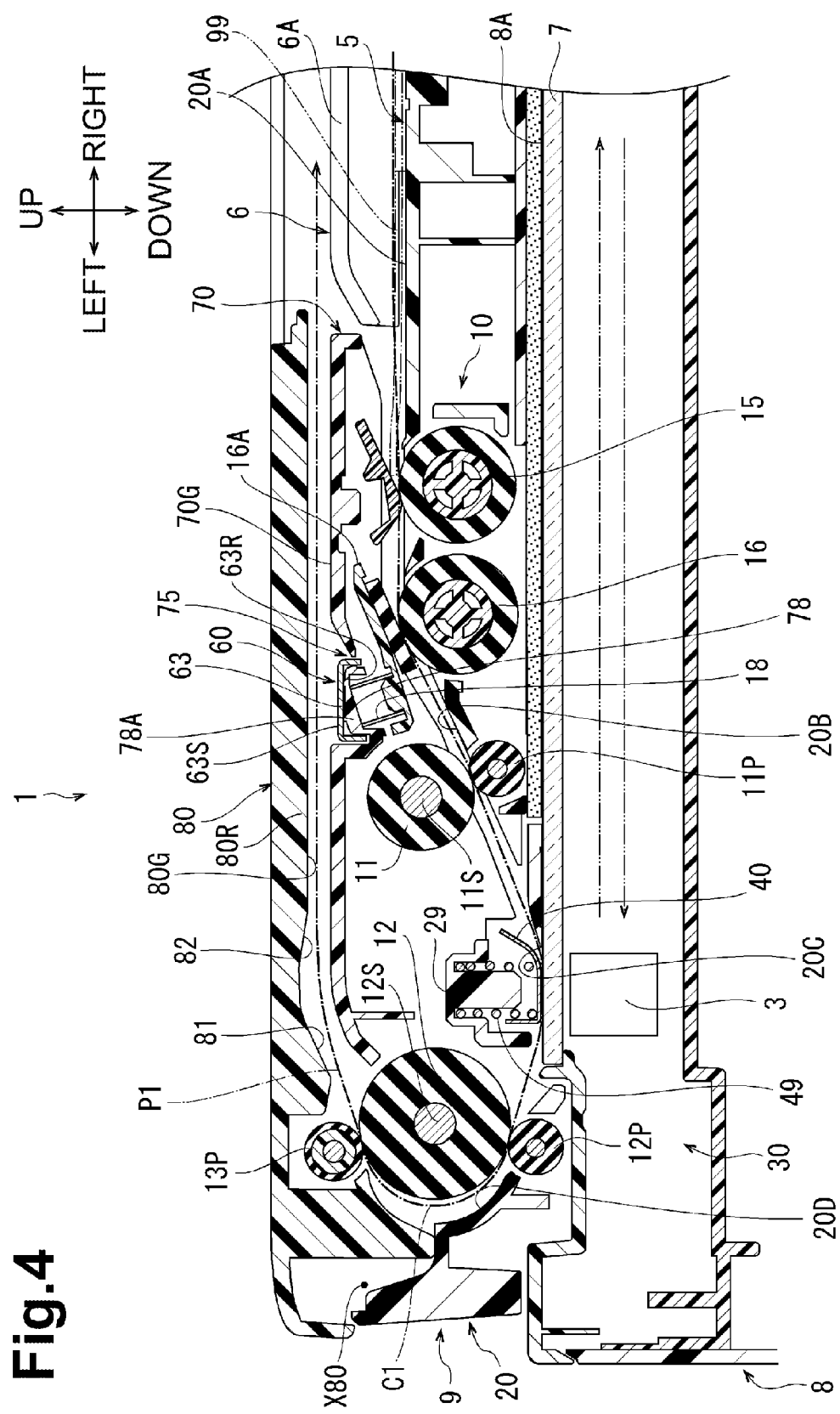
FIG. 4 is a partial cross sectional view depicting the image reader in the first illustrative embodiment according to one or more aspects of the disclosure.

As depicted in FIGS. 1 to 4, the image reader 1 may comprise a main body 8 and an openable portion 9. The main body 8 may have a substantially flat box shape and may comprise the control panel 5 at its front as depicted in FIG. 1. As depicted in FIG. 2, an image formation unit 4 may be disposed in a lower portion of the main body 8. The image formation unit 4 may accommodate therein an image formation portion of one of an inkjet type and a laser type. As depicted in FIGS. 2 and 4, the main body 8 may comprise a reading unit 30 in its upper portion. The reading unit 30 may comprise a platen glass 7 as its upper surface. The platen glass 7 may comprise a support surface 8A at its upper surface. The support surface 8A may be configured to support a document, such as a sheet or a book, thereon, when the image reader 1 reads a stationary document.

As depicted in FIG. 1, the openable portion 9 may be supported by the main body 8 via a hinge (not depicted) disposed at an upper edge of a rear surface of the main body 8. The openable portion 9 may be configured to swing about an axis X9 extending along the right-left direction. As indicated by a solid line in FIG. 1, the openable portion 9 may cover the support surface 8A from above when the openable portion 9 is closed. The openable portion 9 may be configured such that its forward portion may be moved upward and rearward by swinging about the axis X9. As indicated by a double-dotted-and-dashed line in FIG. 1, the openable portion 9 may expose an upper surface of the support surface 8A when the forward part of the openable portion 9 is located at the upwardly-rearward position. With the exposure of the upper surface of the support surface 8A, a user may be allowed to place a document to be read on the support surface 8A.

As depicted in FIGS. 2 to 6, the image reader 1 may further comprise a supply portion 5, a reading portion 3, a sheet stack portion 6, and an automatic document conveyor mechanism 10. The reading portion 3 may be an example of a "processing portion". The automatic document conveyor mechanism 10 may be an example of a "conveyor device".

As depicted in FIGS. 2 and 4, the reading portion 3 may be accommodated in the reading unit 30. A known image reading sensor, e.g., a contact image sensor ("CIS") or a charge-coupled device ("CCD"), may be adopted as the reading portion 3. The reading portion 3 may be configured to reciprocate along the right-left direction under the platen glass 7 by a scanning mechanism (not depicted). When a document placed on the support surface 8A is read by the reading portion 3, as depicted in FIG. 2, the scanning mechanism may operate to move the reading portion 3 from a left end to a right end in the reading unit 30. When an image is read by the reading portion from each of a plurality of sheets 99, i.e., a plurality of documents to be read, placed on the supply portion 5, the scanning mechanism may operate to move the reading portion 3 to the left end in the reading unit 30. The position of the reading portion 3 depicted in FIGS. 2 and 4 may be a fixed position.

As depicted in FIGS. 1 to 4, the image reader 1 may further comprise a document mount 9A, a base 20, a guide member 70, and a cover 80, each of which may comprise resin material. As depicted in FIGS. 1 to 3, the document mount 9A may be disposed at a top of the openable portion 9 and may be configured to be opened and closed. The document mount 9A may constitute the supply portion 5 when opened. The opened document mount 9A (i.e., the supply portion 5) may be configured to support one or more sheets 99 thereon when an image is read from the one or more sheets 99 by the reading portion 3 while the sheets 99 are conveyed one by one by the automatic document conveyor mechanism 10. The sheet 99 may comprise paper and an overhead projector ("OHP") sheet. The document mount 9A may constitute a portion of an upper exterior of the openable portion 9 when closed.

Figure 5:
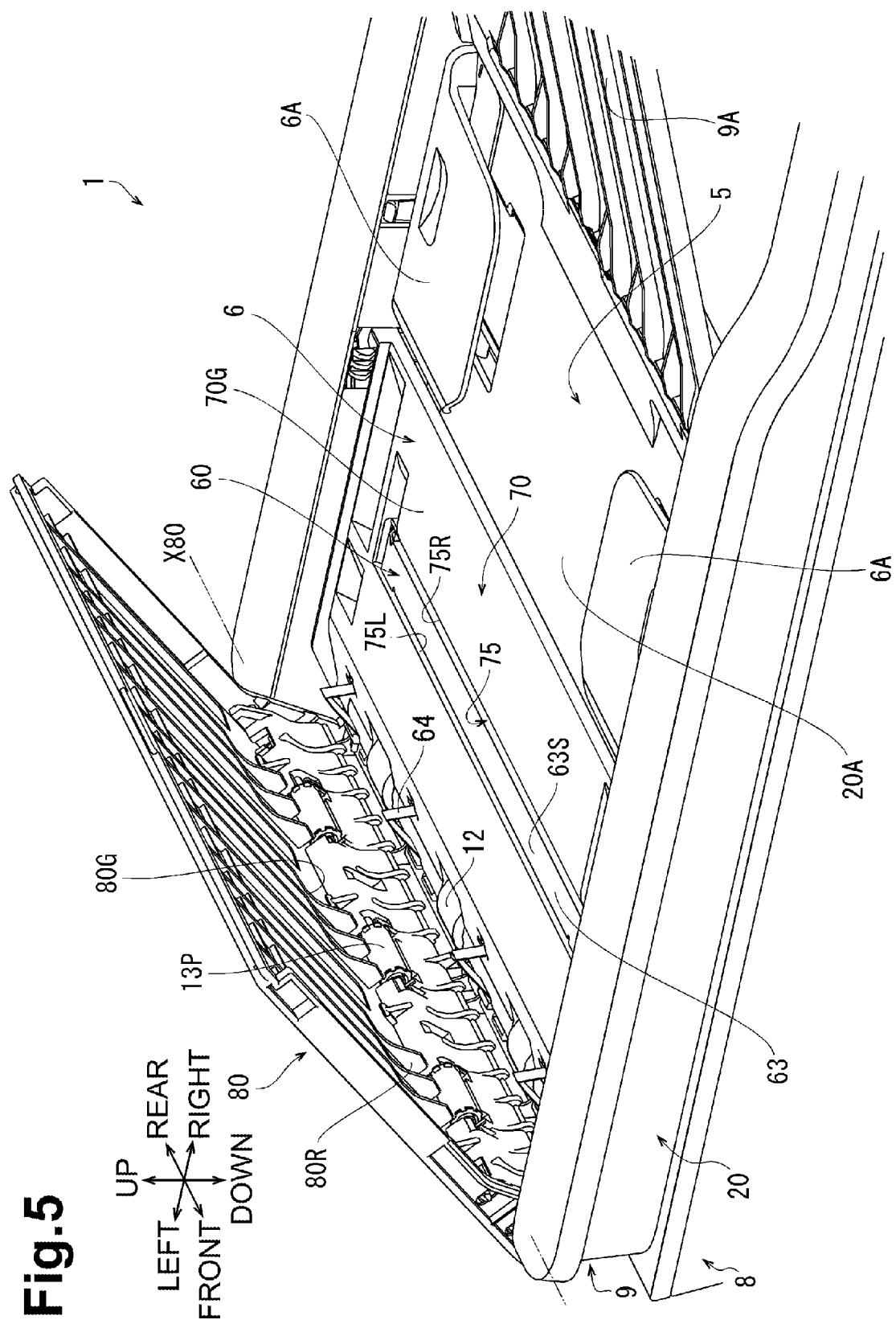
FIG. 5 is a partial perspective view depicting a cover located at an open position, a first guide surface, and a conducting member in the image reader in the first illustrative embodiment according to one or more aspects of the disclosure.

As depicted in FIGS. 3 to 5, the base 20 may constitute a lower portion of the openable portion 9. The base 20 may have a substantially flat plate-like shape and extend to cover the support surface 8A entirely. The base 20 may be configured to accommodate the automatic document conveyor mechanism 10 therein.

As depicted in FIG. 3, the base 20 may comprise a support surface 20A at its upper surface. The support surface 20A may be connected to a left end of the opened document mount 9A and extend substantially horizontally toward the left from the connecting portion. The support surface 20A may be configured to support, from below, one or more sheets 99 placed on the document mount 9A. The support surface 20A may also constitute the supply portion 5 in cooperation with the opened document mount 9A.

As depicted in FIG. 4, the base 20 may comprise an inclined surface 20B, a curved surface 20D, and an urging member support portion 29 and may have an opening 20C therein. The inclined surface 20B may be disposed to the left of the support surface 20A and continue from the support surface 20A. The inclined surface 20B may be inclined leftward and downward. The opening 20C may have a rectangular shape elongated in the front-rear direction and may be defined to the left of the inclined surface 20B. The curved surface 20D may be disposed to the left of the opening 20C and may be curvedly inclined leftward and upward. The urging member support portion 29 may be disposed above the opening 20C. The urging member support portion 29 may be elongated in the front-rear direction and may be bridged over the opening 20C in the front-rear direction.

An urging member 40 may be disposed below the urging member support portion 29. The urging member 40 may be supported by the urging member support portion 29 to be movable in the up-down direction. The urging member 40 may face the reading portion 3 located at the fixed position via the opening 20C and an exposed portion of the platen glass 7 through the opening 20C.

A compression coil spring 49 may be disposed between the urging member support portion 29 and the urging member 40. An upper end of the compression coil spring 49 may be retained by the urging member support portion 29. A lower end of the compression coil spring 49 may be in contact with the urging member 40. The compression coil spring 49 may be configured to urge the urging member 40 downward, that is, toward the reading portion 3.

As depicted in FIGS. 4 to 8, the guide member 70 may be disposed above a leftward portion of the support surface 20A, the inclined surface 20B, the opening 20C and the urging member support portion 29, and may extend in the front-rear and right-left directions. The guide member 70 may be disposed above the base 20 while being bridged over the support surface 20A in the front-rear direction and its front and rear end portions may be fixed to the base 20. The guide member 70 may comprise a first guide surface 70G. The first guide surface 70G may extend substantially horizontally and serve as an upper surface of the guide member 70. The guide member 70 may comprise a conducting member 60. A configuration of the conducting member 60 is described in detail later.

Figure 6:
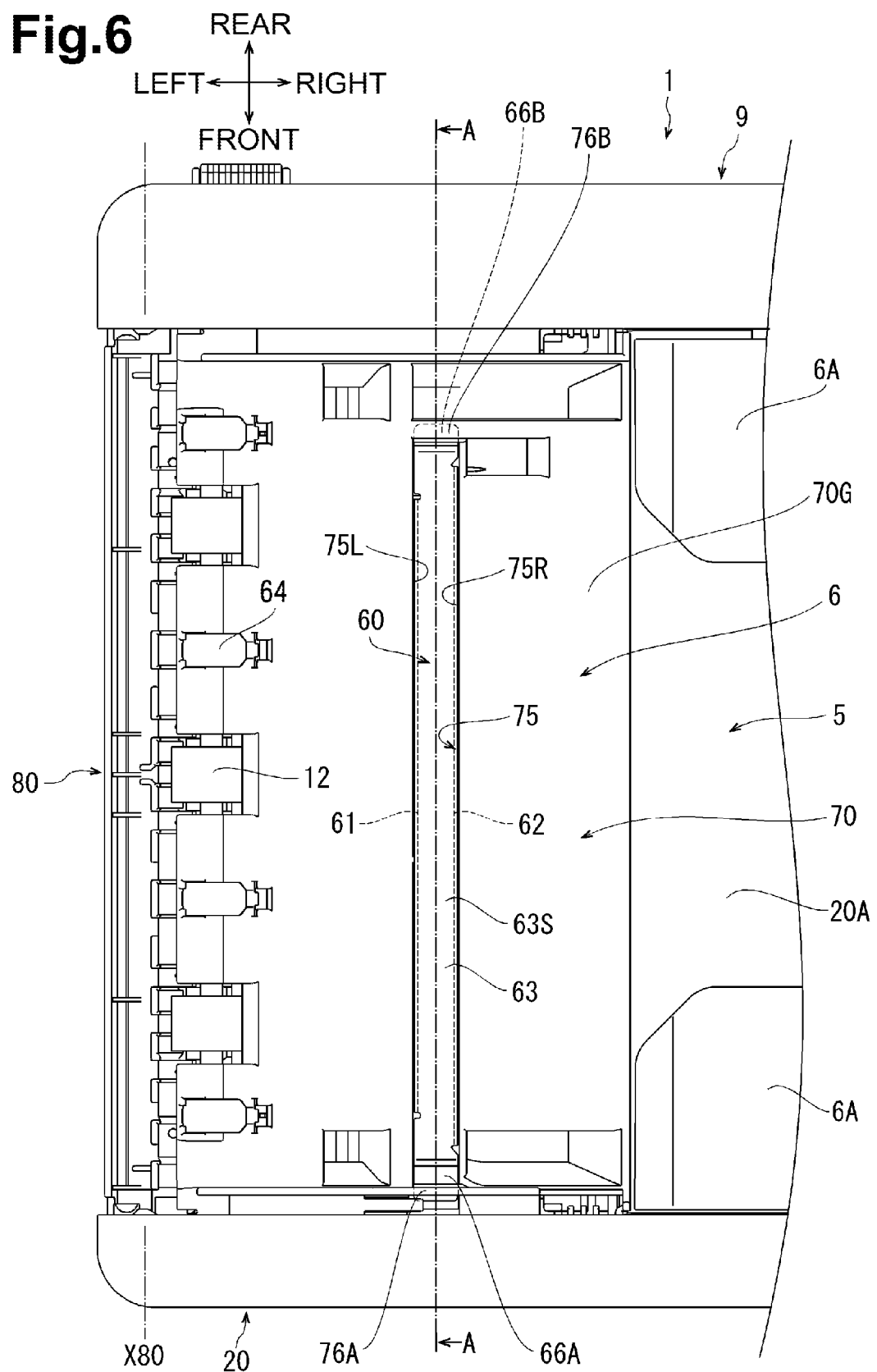
FIG. 6 is a partial top view depicting the cover located at the open position, the first guide surface, and the conducting member in the image reader in the first illustrative embodiment according to one or more aspects of the disclosure.

As depicted in FIGS. 1 to 6, the cover 80 may be supported by the base 20 and configured to pivot about an axis X80 to be opened and closed. The axis X80 may extend in the front-rear direction at a left end portion of the cover 80. As depicted in FIGS. 1 to 4, when the cover 80 is closed, the cover 80 may extend in the front-rear and right-left directions above the guide member 70. As depicted in FIGS. 5 and 6, when the cover 80 is opened by pivoting about the axis X80 to be separated upward from the first guide surface 70G, the cover 80 may be located at a higher position spaced apart from the first guide surface 70G.

As depicted in FIGS. 4 and 5, the cover 80 may comprise a second guide surface 80G and a plurality of ribs 80R. The ribs 80R may protrude from a lower surface of the cover 80 and extend in the right-left direction. End surfaces, facing downward, of the ribs 80R may define the second guide surface 80G. The second guide surface 80G may be connected to the curved surface 20D and curvedly and upwardly inclined toward the right. The second guide surface 80G may extend rightward while facing the first guide surface 70G from above when the cover 80 is closed.

As depicted in FIGS. 3 to 6, a sheet stack portion 6 includes a pair of front and rear side guides 6A that may be disposed on the support surface 20A and may be configured to be slidable in the front-rear direction. The side guides 6A may face each other in the front-rear direction. Further, the side guides 6A may protrude vertically upward and be bent such that the side guides 6A may extend toward each other in the front-rear direction. The side guides 6A may be configured to position one or more sheets 99 placed on the document mount 9A and the support surface 20A in the front-rear direction. As depicted in FIG. 4, a sheet 99 conveyed by the automatic document conveyor mechanism 10 may pass above the reading portion 3 located at the fixed portion where the reading portion 3 may face the opening 20C, and then, be guided by the curved surface 20D and peripheral surfaces of an ejection roller 12. Then, the sheet 99 guided by the curved surface 20D and the ejection roller 12 may be turned upside down at this position. Then, the sheet may pass a nip point between the ejection roller 12 and a third pinch roller 13. After that, the sheet 99 may be guided by the first guide surface 70G that may be the upper surface of the guide member 70. Thus, the sheet 99 may reach above bent portions of the side guides 6A and stop to be conveyed. In this state, the sheet 99 may be supported by the bent portions of the side guides 6A from below while being also guided by the first guide surface 70G from below. That is, the first guide surface 70G and the bent portions of the side guides 6A may constitute the sheet stack portion 6. The supply portion 5 may be disposed below the sheet stack portion 6.

As depicted in FIGS. 2 and 4, the base 20, the guide member 70 and the cover 80 may define a conveyance path P1. That is, as depicted in FIG. 4, the conveyance path P1 may extend obliquely and downwardly along the inclined surface 20B from the support surface 20A and further extend above the exposed portion of the platen glass 7 through the opening 20C. In this position, a lower surface of the guide member 70 and a lower surface of the urging member 40 may define the conveyance path P1 from above. The conveyance path P1 may extend curvedly and upwardly along the curved surface 20D and the second guide surface 80G and further extend toward the right. The conveyance path P1 may be configured to change a conveying direction of a sheet 99 that may be conveyed along the conveyance path P1 to a rightward direction, in this position. Then, the conveyance path P1 may further extend toward the right along the first guide surface 70G of the guide member 70 and thus reach above the bent portions of the side guides 6A. In this position, the second guide surface 80G may face the first guide surface 70G to define a portion of the conveyance path P1. The first guide surface 70G may be configured to make contact with a sheet 99 being conveyed and guide the sheet 99 toward the position above the bent portions of the side guides 6A in cooperation with the first guide surface 70G.

As described above, the conveyance path P1 may be configured to direct one or more sheets 99 placed on the supply portion 5 to the reading portion 3 and further direct the sheet 99 to the sheet stack portion 6.

In the conveyance path P1, a section in which the conveyance path P1 may be curved upwardly along the curved surface 20D and the second guide surface 80G and change the conveying direction of the sheet 99 to the rightward direction may be referred to as a curved path C1.

The automatic document conveyor mechanism 10 may be configured to separate, one by one, one or more sheets 99 placed on the document mount 9A and the support surface 20A constituting the supply portion 5 and convey the separated sheet 99 along the conveyance path P1 depicted in FIGS. 2 and 4 to eject the sheet 99 to the sheet stack portion 6.

More specifically, as depicted in FIG. 4, the automatic document conveyor mechanism 10 may comprise a supply roller 15, a separation roller 16, and a separation pad 16A. The separation roller 16 and the separation pad 16A may be an example of a "separation portion". The supply roller 15 and the separation roller 16 may be rotatably supported by the base 20. Upper ends of the supply roller 15 and the separation roller 16 may be exposed at the left of the support surface 20A of the base 20. The separation roller 16 may be disposed downstream of the supply roller 15 in the conveyance path P1, that is, disposed to the left of the supply roller 15.

Figure 8:
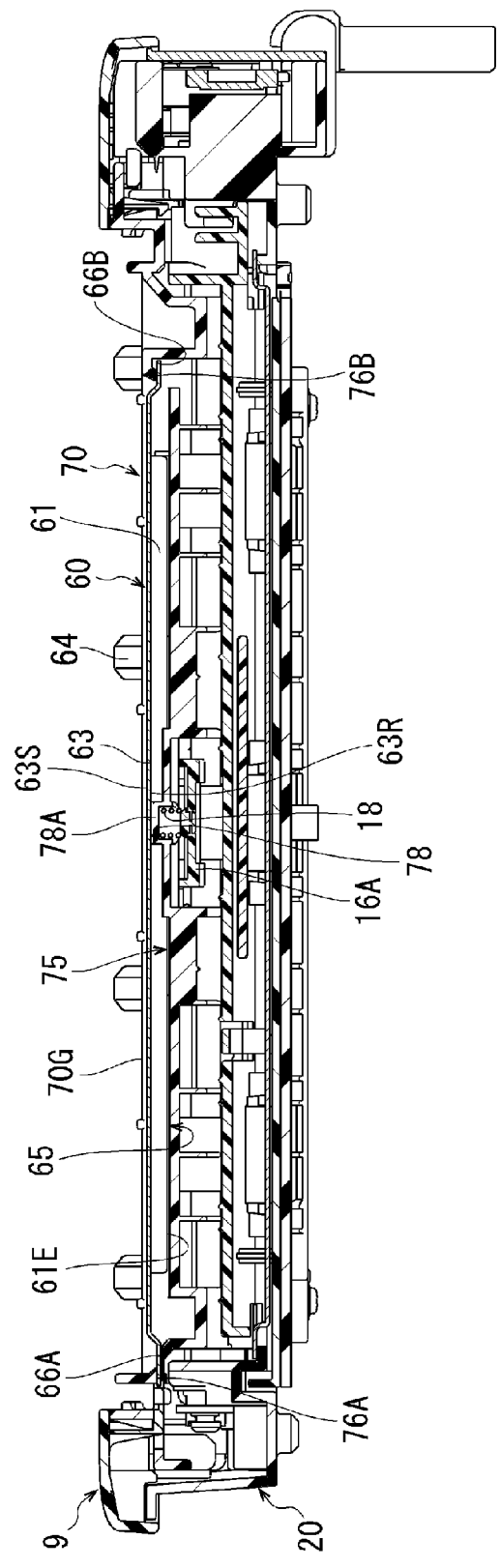
FIG. 8 is a cross sectional view depicting the image reader taken along line VIII-VIII in FIG. 6 in the first illustrative embodiment according to one or more aspects of the disclosure.

The separation pad 16A may be disposed above the separation roller 16 while the conveyance path P1 is interposed therebetween. The separation pad 16A may be movably supported by the guide member 70. A compression coil spring 18 may be disposed between the guide member 70 and the separation pad 16A. The compression coil spring 18 may be an example of an "urging member". As depicted in FIGS. 4 and 8, an upper end of the compression coil spring 18 may be retained by a spring retainer portion 78 that may be disposed on a lower surface of the guide member 70. The spring retainer portion 78 may be disposed at a substantially middle portion of the guide member 70 in the front-rear direction. A lower end of the compression coil spring 18 may be in contact with the separation pad 16A and configured to exert a downstream urging force on the separation pad 16A. With this configuration, the separation pad 16A may be urged toward the separation roller 16.

As depicted in FIG. 4, the supply roller 15 and the separation roller 16 may be configured to rotate and feed one or more sheets 99 placed on the document mount 9A and the support surface 20A into the conveyance path P1 while being in contact with a lowermost one of the one more sheets 99 from below. At that time, the supply roller 15 and the separation roller 16 may be configured to separate the sheets 99 one by one when two or more sheets 99 are stacked thereon.

The automatic document conveyor mechanism 10 may comprise a first rotation shaft 11S, a conveyor roller 11, a first pinch roller 11P, a second rotation shaft 12S, the ejection roller 12, a second pinch roller 12P, and the third pinch roller 13P.

The first rotation shaft 11S may comprise a cylindrical shaft body extending in the front-rear direction and may be disposed above the inclined surface 20B. Front and rear ends of the first rotation shaft 11S may be rotatably supported by the base 20.

The second rotation shaft 12S may comprise a cylindrical shaft body extending in the front-rear direction and may be disposed above the curved surface 20D. Front and rear ends of the second rotation shaft 12S may be rotatably supported by the base 20.

The first rotation shaft 11S and the second rotation shaft 12S may be configured to be controlled by a control device (not depicted) to rotate in synchronization with the supply roller 15 and the separation roller 16.

The conveyor roller 11 may be fixed on the first rotation shaft 11S. The conveyor roller 11 may face the inclined surface 20B from above while the conveyance path P1 may be interposed therebetween. The conveyor roller 11 may be configured to be rotated by the first rotation shaft 11S.

The first pinch roller 11P may be rotatably supported by the base 20. An upper end of the first pinch roller 11P may be exposed through the inclined surface 20B. The first pinch roller 11P may face the conveyor roller 11 from below while the conveyance path P1 may be interposed therebetween. The first pinch roller 11P may be urged toward the conveyor roller 11. The first pinch roller 11P may be configured to be rotated following the rotation of the conveyor roller 11.

The ejection roller 12 may be fixed on the second rotation shaft 12S. The ejection roller 12 may face the curved surface 20D from above and the right and face a curved portion of the cover 80 located to the left of the second guide surface 80G from below and the right while the conveyance path P1 may be interposed therebetween. A peripheral surface of the ejection roller 12 may define a right portion of the curved path C1. The ejection roller 12 may be configured to be rotated by the second rotation shaft 12S.

The second pinch roller 12P may be rotatably supported by the base 20. An upper end of the second pinch roller 12P may be exposed through the curved surface 20D. The second pinch roller 12P may face the ejection roller 12 from below while the conveyance path P1 may be interposed therebetween. The second pinch roller 12P may be urged toward the ejection roller 12. The second pinch roller 12P may be configured to be rotated following the rotation of the ejection roller 12.

The third pinch roller 13P may be rotatably supported by the cover 80. The third pinch roller 13P may face the ejection roller 12 from above and may be urged toward the ejection roller 12 while the conveyance path P1 may be interposed therebetween. The third pinch roller 13P may be configured to be rotated following the rotation of the ejection roller 12.

The conveyor roller 11 and the first pinch roller 11P may be disposed upstream of the reading portion 3 in the conveyance path P1. The ejection roller 12, the second pinch roller 12P, and the second pinch roller 12P and the third pinch roller 13P may be disposed downstream of the reading portion 3 in the conveyance path P1. The first guide surface 70G and the second guide surface 80G may be disposed downstream of the ejection roller 12 and the third pinch roller 13P in the conveyance path P1.

The conveyor roller 11 and the first pinch roller 11P may convey a sheet 99 fed into the conveyance path P1 by the supply roller 15 and the separation roller 16 toward the opening 20C, that is, toward the reading portion 3 located at the fixed position to pass the sheet 99 between the exposed portion of the platen glass 7 through the opening 20C and the lower surface of the urging member 40, that is, over the reading portion 3.

Then, the ejection roller 12, the second pinch roller 12P, and the third pinch roller 13P may change the conveying direction of the sheet 99 that has passed over the reading portion 3 to the upward direction such that the sheet 99 may be U-turned in the curved path C1, and thus, eject the sheet 99 to the sheet stack portion 6. During the conveyance of the sheet 99, the first guide surface 70G may guide the sheet 99 being conveyed toward the sheet stack portion 6 while making contact with the sheet 99 from below. The second guide surface 80G may also guide the sheet 99 being conveyed toward the sheet stack portion 6 while making contact with the sheet 99 from above. Thus, the sheet 99 may be ejected onto the first guide surface 70G and the bent portions of the side guides 6A constituting the sheet stack portion 6. That is,
the first guide surface 70G may serve both as the conveyance guide for a sheet 99 and the place where one or more sheets 99 may be stacked.

Figure 7:
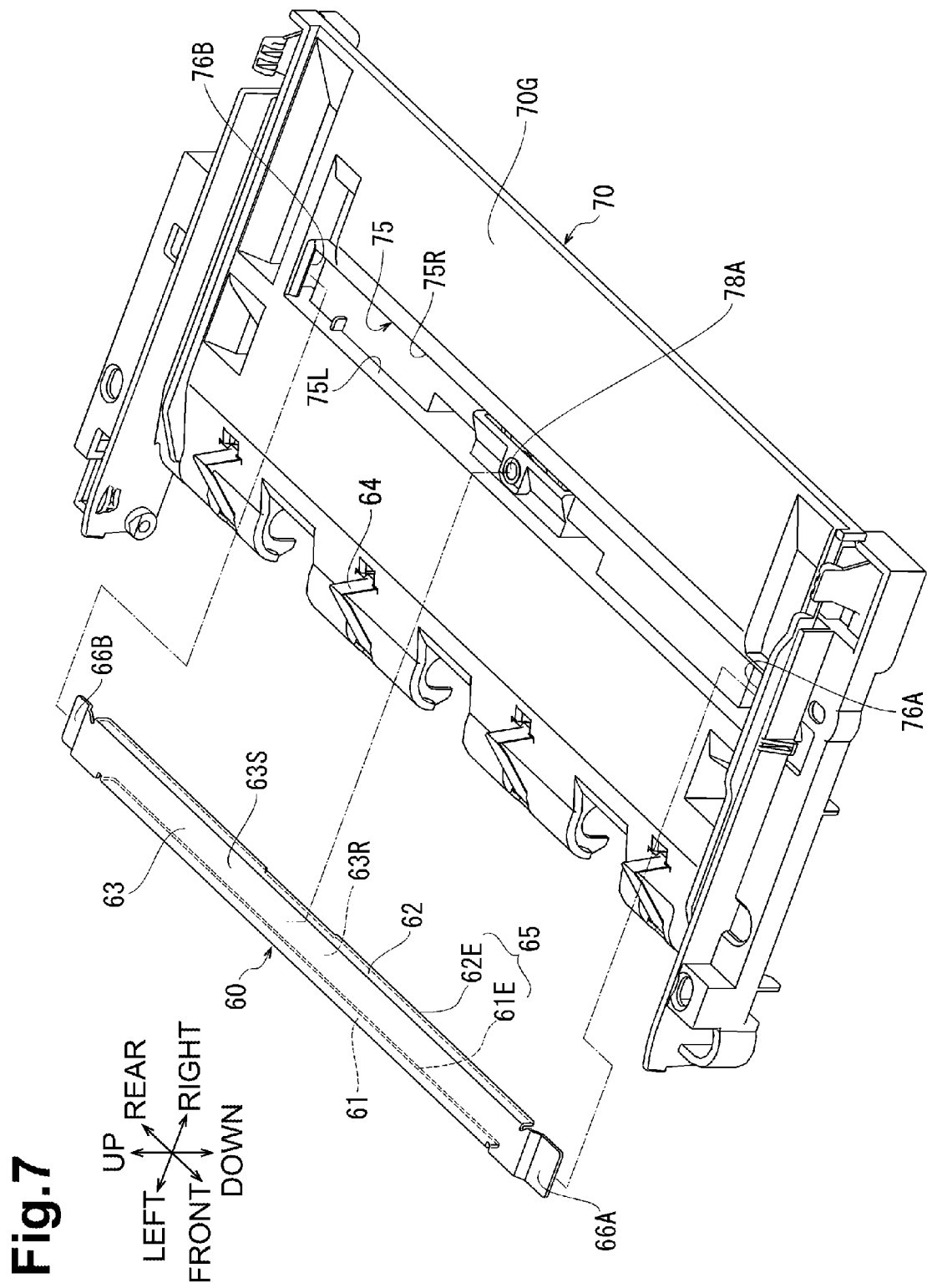
FIG. 7 is a perspective view depicting a guide member including the first guide surface, and the conducting member in the image reader in the first illustrative embodiment according to one or more aspects of the disclosure.

As depicted in FIGS. 5 to 7, a plurality of sheet lift members 64 may be disposed side by side in the front-rear direction at the left end portion of the first guide surface 70G. Each sheet lift member 64 may comprise an elastic body, such as a resin film. The sheet lift members 64 may be configured to be depressed by a sheet 99, e.g., a first sheet, to allow the first sheet 99 to be ejected while the first sheet 99 is nipped between the ejection roller 12 and the ejection pinch roller 13 to be ejected to the sheet stack portion 6. When the first sheet 99 is disengaged from the ejection roller 12 and the ejection pinch roller 13 and thus stops being conveyed onto the sheet stack portion 6, the sheet lift members 64 may move upward to lift a downstream edge of the first sheet 99. Thus, when the automatic document conveyor mechanism 10 conveys another sheet 99, e.g., a second sheet, the second sheet 99 may be nipped between the ejection roller 12 and the ejection pinch roller 13 and slide under the first sheet 99 placed on the sheet stack portion 6 at the time the second sheet 99 is ejected to the sheet stack portion 6.

In the image reader 1 configured as described above, when the image reader 1 reads a document placed on the support surface 8A, as depicted in FIG. 2, the scanning mechanism may operate to move the reading portion 3 in the reading unit 30 from the left end to the right end. With this movement, the reading portion 3 may read an image from the document placed on the support surface 8A. After that, the scanning mechanism may move the reading portion 3 that completed reading in the reading unit 30 from the right end to the left end to return the reading portion 3 to the original position.

When the image reader 1 reads an image from each of a plurality of sheets 99 placed on the document mount 9A and the support surface 20A constituting the supply portion 5, as depicted in FIGS. 2 and 4, the scanning mechanism may operate to move the reading portion 3 in the reading unit 30 to the fixed position that may be the left end position. After that, when the automatic document conveyor mechanism 10 conveys the plurality of sheets 99 placed on the document mount 9A and the support surface 20A successively along the conveyance path P1, the sheet 99 being conveyed may pass over the reading portion 3 located at the fixed position. While the sheet 99 passes over the reading portion 3, the reading portion 3 may read an image from the sheet 99 passing above. Then, the automatic document conveyor mechanism 10 may convey the sheet 99 whose image has been read to the sheet stack portion 6 successively, and eject the sheet 99 to the sheet stack portion 6 successively such that the sheet 99 to be ejected may slide under a preceding sheet 99 that has been ejected on the sheet stack portion 6.

As described above, the image reader 1 may be allowed to selectively read an image from a document place on the support surface 8A and an image from one or more sheets 99 placed on the supply portion 5.

The conducting member 60 now is described in detail. When the automatic document conveyor mechanism 10 conveys a sheet 99 along the conveyance path P1 in the image reader 1 according to the first illustrative embodiment, static electricity may build up on the sheet 99 due to friction caused between the sheet 99 and each of the document mount 9A, the base 20, the guide member 70 and the cover 80, each of which may comprise resin material. Therefore, as depicted in FIGS. 4 to 9, the image reader 1 may further comprise the conducting member 60 through which static electricity that has built up on the sheet 99 to be ejected onto the sheet stack portion 6 by the ejection roller 12 and the third pinch roller 13P may be discharged.

The conducting member 60 may comprise a steel sheet that may be punched and bent. The conducting member 60 may be accommodated in the accommodation portion 75 defined in the first guide surface 70G. The accommodation portion 75 may be a substantially rectangular groove defined in a substantially middle portion of the first guide surface 70G in the right-left direction and elongated in the front-rear direction.

The accommodation portion 75 may be a recessed portion that may be molded integrally with the first guide surface 70G when thermoplastic resin is molded by injection molding to form the guide member 70. That is, an injection molding die for the guide member 70 may have a protruding portion that may protrude from an inner surface of a cavity defining the first guide surface 70G. Thus, the accommodation portion 75 may be defined in the first guide surface 70G by the protruding portion of the injection molding die.

The conducting member 60 may comprise a contact portion 63, an upstream bent portion 61, a downstream bent portion 62, and a discharge portion 65.

The contact portion 63 may have a substantially plate-like shape having a longer dimension in the front-rear direction and a shorter dimension in the right-left direction. When the conducting member 60 is accommodated in the accommodation portion 75, an upper surface 63S of the contact portion 63 may be exposed from a portion of the first guide surface 70G and extend evenly and continuously to the first guide surface 70G such that the upper surface 63S of the contact portion 63 may extend along a sheet 99 to be conveyed by the ejection roller 12 and the third pinch roller 13P. A phrase "the upper surface 63S may extend evenly and continuously to the first guide surface 70G" may allow the upper surface 63S to comprise asperities, a bent portion, and/or a warped portion therein. The upper surface 63S of the contact portion 63 may be configured to come into contact with a sheet 99 from below at the portion of the first guide surface 70G.

As depicted in FIG. 7, the upstream bent portion 61 may be bent at substantially right angles from an upstream side of the contact portion 63 in the conveyance path P1, that is, from an upstream end located at the left of the contact portion 63. The upstream bent portion 61 may extend in a direction to recede from the conveyance path P1, that is, downward.

The downstream bent portion 62 may be bent at substantially right angles from a downstream side of the contact portion 63 in the conveyance path P1, that is, from a downstream end located at the right of the contact portion 63. The downstream bent portion 62 may extend in a direction to recede from the conveyance path P1, that is, downward.

The upstream bent portion 61 and the downstream bent portion 62 may be in contact with a left inner-wall surface 75L and a right inner-wall surface 75R, respectively, of the accommodation portion 75 when the conducting member 60 is accommodated in the accommodation portion 75. Thus, the accommodation portion 75 may position the conducting member 60 in the right-left direction while accommodating the upstream bent portion 61 and the downstream bent portion 62 therein.

Figure 9:
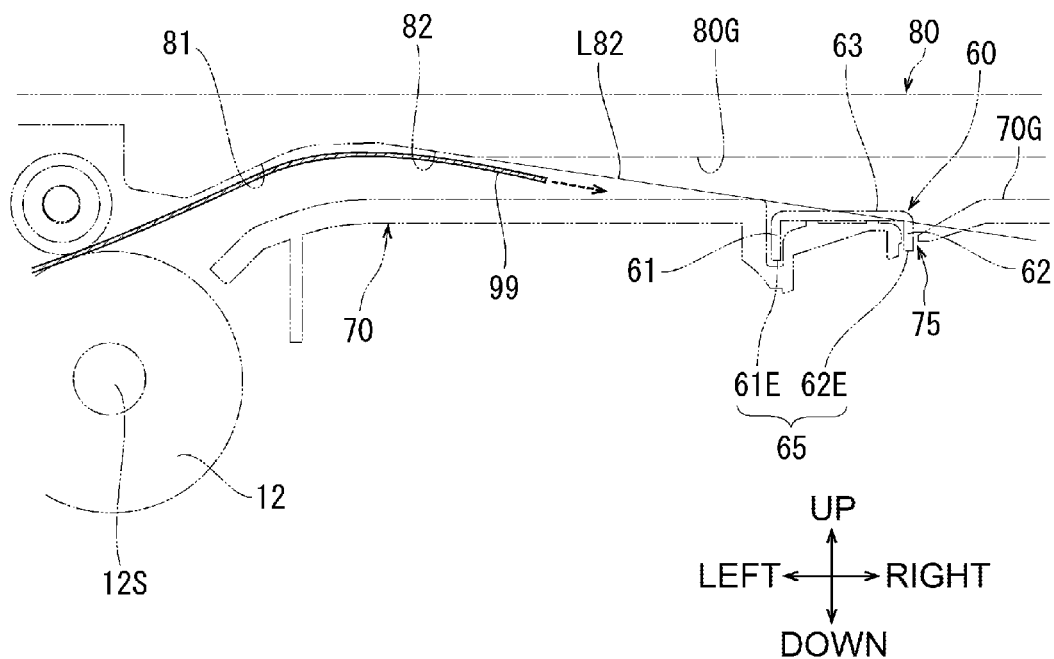
FIG. 9 is a schematic view for explaining action of a first shaped portion and a second shaped portion of a second guide surface in the image reader in the first illustrative embodiment according to one or more aspects of the disclosure.

As depicted in FIGS. 7 and 9, the discharge portion 65 may comprise an end 61E of the upstream bent portion 61 and an end 62E of the downstream bent portion 62. The discharge portion 65 may be configured to discharge static electricity that may be transferred to the contact portion 63 by the contact between the sheet 99 and the upper surface 63S of the contact portion 63, by corona discharge from the end 61E of the upstream bent portion 61 and the end 62E of the downstream bent portion 62.

As depicted in FIGS. 6 to 8, the conducting member 60 may further comprise engagement portions 66A and 66B in the width direction of the sheet 99 to be conveyed toward the sheet stack portion 6, that is, at both ends thereof in the front-rear direction. The front engagement portion 66A may be cranked downward from a front end of the contact portion 63 and protrude toward the front. As depicted in FIGS. 7 and 8, the front engagement portion 66A may be configured to be engaged with an engagement portion 76A disposed at a front end of the guide member 70. The rear engagement portion 66B may be cranked downward from a rear end of the contact portion 63 and protrude toward the rear. The rear engagement portion 66B may be configured to be engaged with an engagement portion 76B disposed at a rear end of the guide member 70. With this configuration, the conducting member 60 may be engaged with the guide member 70 at its front and rear ends.

As depicted in FIGS. 4, 7, and 8, the contact portion 63 may comprise a lower surface 63R on an opposite side to the upper surface 63S, and the lower surface 63R may face the guide member 70. The lower surface 63R may be configured to contact a protrusion 78A disposed right above the spring retainer portion 78 of the guide member 70 from above at a middle of the guide member 70 in the front-rear direction. The lower surface 63R of the contact portion 63, the protrusion 78A and the spring retainer portion 78 of the guide member 70 may overlap in the up-down direction.

As depicted in FIGS. 4 and 9, the second guide surface 80G may comprise a first shaped portion 81 and a second shaped portion 82. The first shaped portion 81 and the second shaped portion 82 may be disposed at respective positions upstream of the contact portion 63 in the conveyance path P1, that is, to the left of the contact portion 63.

The first shaped portion 81 may extend obliquely upward and rightward from a position downstream of the ejection roller 12 and the third pinch roller 13P in the conveyance path P1, that is, from the right of the third pinch roller 13P, to recede from the first guide surface 70G. The second shaped portion 82 may be disposed to the right of the first shaped portion 81 and continued from the first shaped portion 81. The second shaped portion 82 may extend in a direction different from the extending direction of the first shaped portion 81, e.g., the acclivity, that is, extend obliquely downward and rightward from the first shaped portion 81 to approach the first guide surface 70G. The second guide surface 80G may extend substantially horizontally toward the right on the right of the second shaped portion 82. As depicted in FIG. 9, the contact portion 63 may be disposed on an extension line L82 of the second shaped portion 82. The first shaped portion 81 and the second shaped portion 82 may be configured to direct a sheet 99 being conveyed to the contact portion 63 as depicted in FIG. 9.

The image reader 1 according to the first illustrative embodiment may comprise the conducting member 60, and the conducting member 60 may comprise the contact portion 63 and the discharge portion 65. The upper surface 63S of the contact portion 63 may be exposed from the portion of the first guide surface 70G and configured to come into contact with a sheet 99 being conveyed from below. By the contact of the sheet 99 with the upper surface 63S of the contact portion 63, static electricity may move from the sheet 99 to the contact portion 63. Then, the discharge portion 65 may discharge static electricity moved to the contact portion 63 by corona discharge from the end 61E of the upstream bent portion 61 and the end 62E of the downstream bent portion 62. Therefore, in the image reader 1, although static electricity builds up on the sheet 99 due to friction caused between the sheet 99 and each of the document mount 9A, the base 20, the guide member 70, and the cover 80 that may comprise resin material, this configuration may reduce or prevent the buildup of static electricity on the first guide surface 70G and/or in the image reader 1. Thus, in the image reader 1, an occurrence of a problem, for example, attraction of dust to the reading portion 3 through static electricity and/or a sheet 99 to be ejected sticking to the sheet stack portion 6 and another sheet 99 already ejected to the sheet stack portion 6 through static electricity, may be reduced or prevented.

Accordingly, in the image reader 1 according to the first illustrative embodiment, degradation of reading quality and a sheet stacking failure on the sheet stack portion 6 caused by the buildup of static electricity may be reduced or prevented.

As depicted in FIG. 9, in the image reader 1, the second guide surface 80G may comprise the first shaped portion 81 and the second shaped portion 82, and the contact portion 63 may be disposed on the extension line L82 of the second shaped portion 82. With this configuration, in the image reader 1, while a sheet 99 is being conveyed by the ejection roller 12 and the third pinch roller 13P, a leading edge of the sheet 99 may move upward along the first shaped portion 81 and then may be downwardly warped along the second shaped portion 82. When the leading edge of the sheet 99 recedes from the second shaped portion 82 by the warping of the sheet 99, the leading edge of the sheet 99 may move along the extension line L82 and come into contact with the contact portion 63 located on the extension line L82. Thus, in the image reader 1, the sheet 99 may be conveyed toward the contact portion 63 further stably due to the presence of the first shaped portion 81 and the second shaped portion 82, and the sheet 99 may surely make contact with the contact portion 63.

In the image reader 1, the discharge portion 65 having a simple configuration may be configured to discharge static electricity by corona discharge from the end 61E of the upstream bent portion 61 and the end 62E of the downstream bent portion 62. Therefore, the degradation of the reading quality in the reading portion 3 and the sheet stacking failure on the sheet stack portion 6 caused by the buildup of static electricity may be reduced or prevented.

In the image reader 1, the upstream bent portion 61 and the downstream bent portion 62 may be accommodated in the accommodation portion 75 defined in the first guide surface 70G. With this configuration, the conducting member 60 may be readily disposed in the first guide surface 70G.

In the image reader 1, as depicted in FIGS. 7 and 8, the upstream bent portion 61 and the downstream bent portion 62 of the conducting member 60 may be accommodated in the accommodation portion 75 that may be the recessed portion defined in the guide member 70 while the lower surface 63R of the contact portion 63 of the conducting member 60 may face the guide member 70. With this configuration, the conducting member 60 may function as a reinforcing member that may strengthen the guide member 70, and more specifically, the first guide surface 70G.

In the image reader 1, as depicted in FIGS. 4, 7, and 8, the reaction of the compression coil spring 18 generated when the compression coil spring 18 urges the separation pad 16A may upwardly act on the guide member 70. The reaction of the compression coil spring 18 may force the guide member 70 to be deformed such that the spring retainer portion 78 and the protrusion 78A may be deformed upward. Nevertheless, in the image reader 1, the lower surface 63R of the contact portion 63 of the conducting member 60 may contact the protrusion 78A from above to strengthen the guide member 70. With this configuration, in the image reader 1, the deformation of the guide member 70 caused by the reaction of the compression coil spring 18 generated when the compression coil spring 18 urges the separation pad 16A may be reduced or prevented.

In the image reader 1, as depicted in FIGS. 6 to 8, the conducting member 60 may be configured to be engaged with the guide member 70 at both ends thereof in the width direction of the sheet 99 conveyed toward the sheet stack portion 6, that is, in the front-rear direction, via the engagement portions 66A and 66B and the engagement portions 76A and 76B. Further, the conducting member 60 may be configured such that the lower surface 63R of the contact portion 63 may be in contact with the protrusion 78A of the guide member 70 from above at the substantially middle of the guide member 70 in the front-rear direction. With this configuration, in the image reader 1, the conducting member 60 may receive the reaction of the compression coil spring 18 that may act on the guide member 70 and spread the reaction on both end portions of the guide member 70 in the front-rear direction. While both end portions of the guide member 70 in the front-rear direction may be engaged with the base 20, an intermediate portion of the guide member 70 in the front-rear direction may bridge over the support surface 20A of the base 20. The front and rear end portions of the guide member 70 may be fixed to a frame member having a width extending in a direction orthogonal to a direction that the first guide surface 70G extends. Therefore, the front and rear end portions of the guide member 70 may have strength higher than the intermediate portion of the guide member 70 in the front-rear direction. Thus, in the image reader 1, the configuration for spreading the reaction of the compression coil spring 18 on both front and rear end portions of the guide member 70 in the front-rear direction may reduce or prevent the deformation of the guide member 70.

In the image reader 1, the supply portion 5 may be disposed below the sheet stack portion 6. The conveyance path P1 may comprise the curved path C1 configured to change the conveying direction of a sheet 99 being conveyed from the supply portion 5 and to direct the sheet 99 to the sheet stack portion 6. Further, the image reader 1 may be configured such that a sheet 99, e.g., the second sheet, to be ejected to the sheet stack portion 6 by the ejection roller 12 may slide under a preceding sheet 99, e.g., the first sheet, already ejected to the sheet stack portion 6. With this configuration, in the image reader 1, an arrangement order of sheets 99 after a plurality of sheets 99 placed on the supply portion 5 are conveyed successively and stacked on the sheet stack portion 6 may be the same as an arrangement order of sheets 99 before the plurality of sheets 99 are conveyed. Therefore, convenience to users may be increased. When static electricity builds up on the second sheet 99 that may slide under the first sheet 99 already ejected to the sheet stack portion 6, the first sheet 99 and the second sheet 99 may stick to each other, resulting in an occurrence of the sheet stacking failure. In this regard, according to the image reader 1, static electricity building up on the second sheet 99 may be discharged by the conducting member 60 before the second sheet 99 to be ejected to the sheet stack portion 6 slides under the first sheet 99 already ejected. Accordingly, this configuration may reduce or prevent the occurrence of the sheet stacking failure on the sheet stack portion 6.

Figure 10:
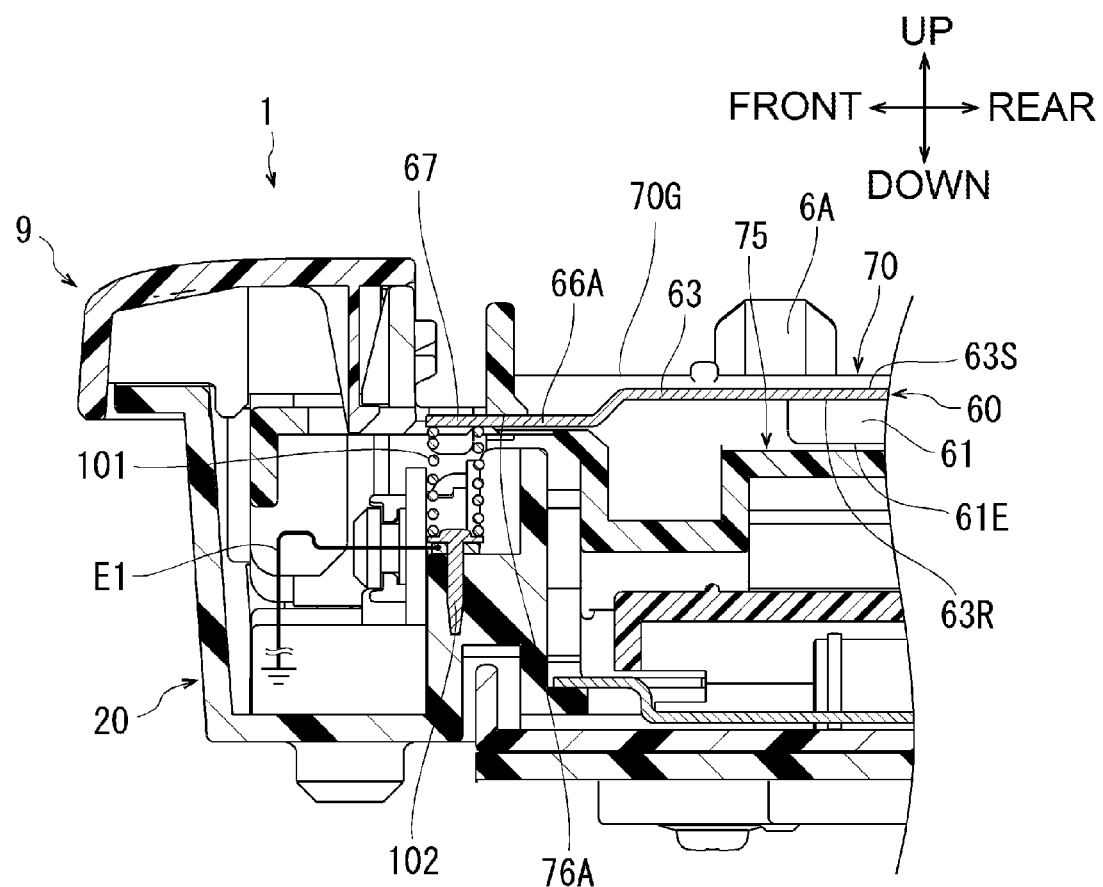
FIG. 10 is a partial cross sectional view depicting a ground line connected to the conducting member in the image reader in a second illustrative embodiment according to one or more aspects of the disclosure.

Next, a second illustrative embodiment according to the aspects of the disclosure is described below. In the image reader 1 according to the first illustrative embodiment, a ground line might not be connected to the conducting member 60. Nevertheless, for example, as depicted in FIG. 10, in the image reader 1 according to the second illustrative embodiment, a ground wire E1 may be connected to the conducting member 60. The other configuration of the image reader 1 according to the second illustrative embodiment may be the same as the configuration of the image reader 1 according to the first illustrative embodiment, and therefore, a description and drawings are omitted for the common parts by assigning the same reference numerals thereto.

In the image reader 1 according to the second illustrative embodiment, the conducting member 60 may comprise a ground connection portion 67 at a front end portion of the engagement portion 66A thereof. The ground connection portion 67 may be continued from the contact portion 63.

A setscrew 102 and a compression coil spring 101 may be disposed in empty space surrounding the engagement portion 76A of the guide member 70. The setscrew 102 may be disposed below the ground connection portion 67 and fix one end of the ground wire E1 to the guide member 70. The other end of the ground wire E1 may be wired inside of the image reader 1 and connected to ground (not depicted). An upper end of the compression coil spring 101 may be in contact with the ground connection portion 67 and a lower end of the compression coil spring 11 may be in contact with the setscrew 102 while being compressed.

In the image reader 1 according to the second illustrative embodiment, static electricity may move from the contact portion 63 by way of the ground connection portion 67, the compression coil spring 101, the setscrew 102, and the ground wire E1, as well as the corona discharge from the discharge portion 65.

Figure 11:
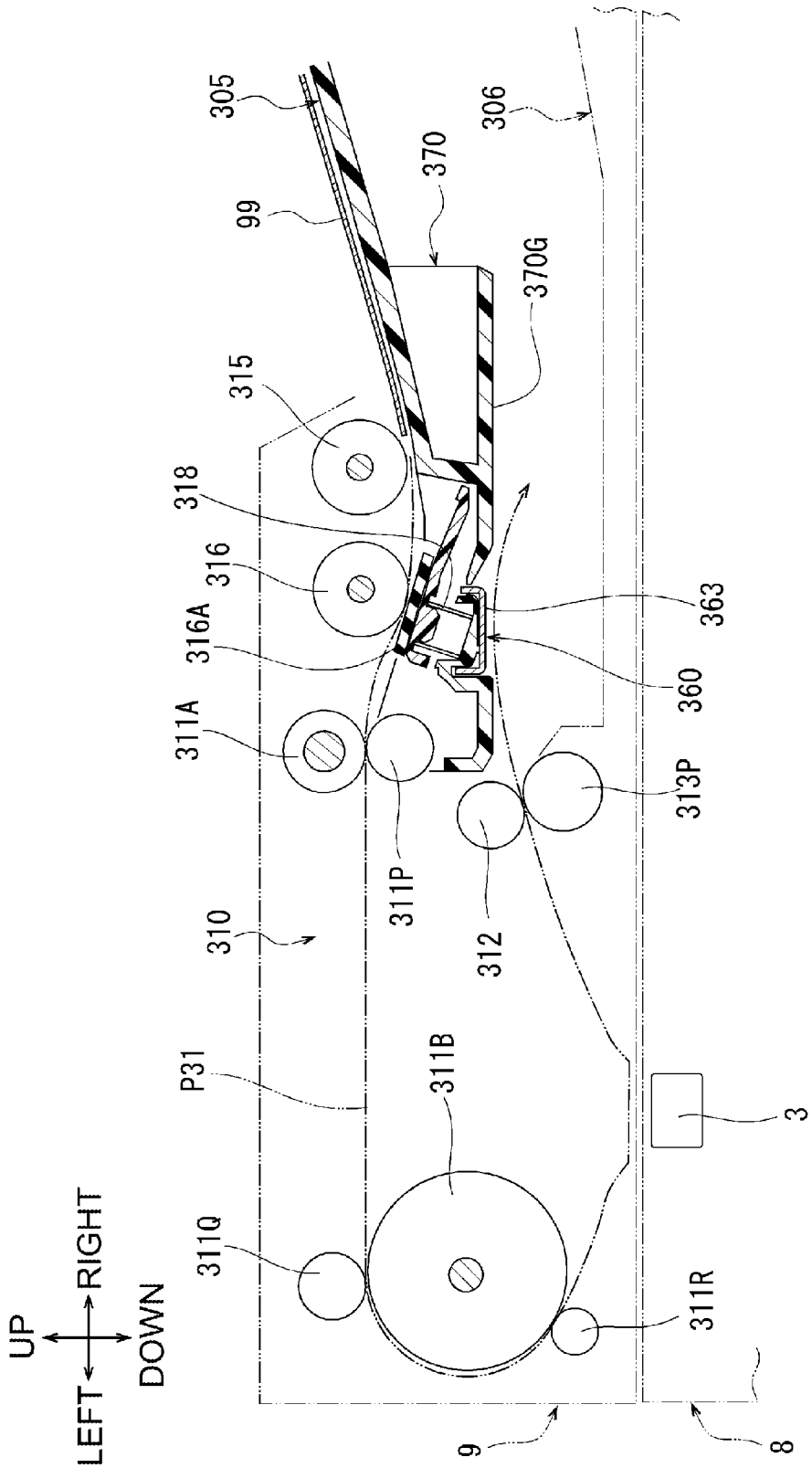
FIG. 11 is a schematic cross sectional view depicting a portion including a first guide surface and a conducting member in the image reader in a third illustrative embodiment according to one or more aspects of the disclosure.

Next, a third illustrative embodiment according to the aspects of the disclosure is described below. In the image reader 1 according to the first illustrative embodiment, the first guide surface 70G and the contact portion 63 of the conducting member 60 may come into contact with a sheet 99 being conveyed to the sheet stack portion 6 from below. Nevertheless, the disclosure is not limited to this configuration. For example, as depicted in FIG. 11, in an image reader according to the third illustrative embodiment, a first guide surface and a contact portion of a conducting member may come into contact with a sheet being conveyed to a sheet stack portion from above.

The image reader according to the third illustrative embodiment may comprise a supply portion 305, a sheet stack portion 306, an automatic document conveyance mechanism 310, and a conveyance path P31 whose places may almost be exchanged in the up-down direction with the supply portion 5, the sheet stack portion 6, the automatic document conveyor mechanism 10 and the conveyance path P1 of the image reader 1 according to the first illustrative embodiment. That is, the supply portion 305 may be disposed above the sheet stack portion 306. The conveyance path P31 may extend leftward from the supply portion 305, be curved downward, and further extend rightward to the sheet stack portion 306.

A guide member 370 may be disposed between the supply portion 305 and the sheet stack portion 306. An upper surface of the guide member 370 may constitute the supply portion 305 on which one or more sheets 99 may be placed. The guide member 370 may comprise a lower surface that may extend substantially horizontally. The lower surface of the guide member 370 may comprise a first guide surface 370G. The first guide surface 370G may be disposed downstream of an ejection roller 312 and an ejection pinch roller 313P in the conveyance path P31. A conducting member 360 may be disposed at the guide member 370. The conducting member 360 may have the same configuration as the conducting member 60 according to the first illustrative embodiment and be disposed upside down. A relative relationship between the guide member 370 and the conducting member 360 may be opposite in position to the positional relationship between the guide member 70 and the conducting member 60 according to the first illustrative embodiment. A contact portion 363 of the conducting member 360 may be exposed from a portion of the first guide surface 370G and extend evenly and continuously to the first guide surface 370G such that the contact portion 363 may extend along a sheet 99 to be conveyed by the ejection roller 312 and the ejection pinch roller 313P.

In the automatic document conveyance mechanism 310, a supply roller 315 and a separation roller 316 may be configured to rotate and feed one or more sheets 99 into the conveyance path P31 while being in contact with an uppermost one of the one or more sheets 99 placed on the supply portion 305 from above. The separation roller 316 and the separation pad 316A urged toward the separation roller 316 from below may be configured to separate the sheets 99 one by one when two or more sheets 99 are stacked thereon.

The separation pad 316A may be movably supported by the guide member 370. A compression coil spring 318 may be disposed between the separation pad 316A and the guide member 370. The locations of the separation pad 316A, the guide member 370, and the compression coil spring 318 may almost be exchanged in the up-down direction with the separation pad 316A, the guide member 70, and the compression coil spring 18 according to the first illustrative embodiment. The conducting member 360 may be configured to receive reaction of the compression coil spring to strengthen the guide member 370, similar to the conducting member 60 according to the first illustrative embodiment.

A first conveyor roller 311A, a first pinch roller 311P, a second conveyor roller 311B, a second pinch roller 311Q, and a third pinch roller 311R may be configured to convey leftward the sheet 99 fed into the conveyance path P31 by the supply roller 315 and the separation roller 316, then further convey the sheet 99 downward to allow the sheet 99 to make a U-turn, and pass the sheet 99 over the reading portion 3 located at the fixed position.

The ejection roller 312 and the ejection pinch roller 313P may be configured to convey leftward the sheet 99 that has passed over the reading portion 3 and eject the sheet 99 to the sheet stack portion 306. During the conveyance of the sheet 99 by the ejection roller 312 and the ejection pinch roller 313P, the first guide surface 370G may be configured to direct the sheet 99 toward the sheet stack portion 306 while being in contact with the sheet 99 being conveyed by the ejection roller 312 and the ejection pinch roller 313P from above. The contact portion 363 of the conducting member 360 may be exposed from the portion of the first guide surface 370G and configured to come into contact with the sheet 99 being conveyed from above. Thus, static electricity may move from the sheet 99 to the conducting member 360, and the conducting member 360 may discharge static electricity therefrom.

In the image reader according to the third illustrative embodiment, similar to the image reader 1 according to the first illustrative embodiment, the degradation of the reading quality and the sheet stacking failure on the sheet stack portion 306 caused by the buildup of static electricity may be reduced or prevented.

While the disclosure has been described in detail with reference to the specific embodiments thereof, they are merely an example, and various changes, arrangements and modifications may be applied therein without departing from the spirit and scope of the disclosure.

For example, the conducting member may be not limited to a steel sheet. In other embodiments, for example, the conducting member may comprise a material having conductivity.

In other embodiments, for example, the aspects of the disclosure may be adopted for a multifunction device having a multiple functions, such as a copying function and a facsimile function as well as the functions of the image reader.

The aspects of the disclosure may be adopted for image readers, image forming apparatus, or multifunction devices.

What is claimed is:

1. A sheet conveyor device comprising:
    a conveyor configured to convey a sheet along a conveyance path in a conveying direction, the conveyor comprising an ejection roller;
    a sheet stack portion configured to receive the sheet conveyed by the conveyor, the ejection roller configured to eject the sheet to the sheet stack portion;
    a first guide surface disposed in the conveyance path and downstream of the ejection roller and upstream of the sheet stack portion in the conveying direction, and configured to guide the sheet to the sheet stack portion; and
    a conducting member comprising:
        a contact portion extending evenly and continuously to the first guide surface along the conveyance path and configured to come into contact with the sheet conveyed by the conveyor; and
        a discharge portion configured to discharge static electricity that is transferred to the contact portion by contact between the sheet and the contact portion.

2. The sheet conveyor device according to claim 1, further comprising:
    a second guide surface disposed along the conveyance path and upstream of the contact portion in the conveying direction and facing the first guide surface to define a portion of the conveyance path,
    the second guide surface configured to guide the sheet conveyed by the conveyor toward the contact portion and guide the sheet toward the sheet stack portion while contacting the sheet conveyed by the conveyor.

3. The sheet conveyor device according to claim 2, wherein the second guide surface comprises:
    a first shaped portion extending from a position downstream of the ejection roller in the conveying direction in a direction receding from the first guide surface; and
    a second shaped portion disposed downstream of the first shaped portion in the conveying direction, extending in a direction approaching the first guide surface, and
    wherein the contact portion is disposed on an imaginary line extending from a downstream end of the second shaped portion.

4. The sheet conveyor device according to claim 1,
    wherein the conducting member comprises at least one of a first protruding portion and a second protruding portion, wherein the first protruding portion extends from one end of the contact portion in a direction to recede from the conveyance path and the second protruding portion extends from another end of the contact portion in the direction to recede from the conveyance path, wherein the conducting member is disposed such that the one end and the other end are positioned at an upstream position and a downstream position, respectively, in the conveying direction, and
    wherein the discharge portion comprises at least one of an end of the first protruding portion and an end of the second protruding portion and is configured to discharge static electricity by corona discharge.

5. The sheet conveyor device according to claim 4, wherein the conducting member further comprises the first protruding portion and the second protruding portion, and
    wherein the first guide surface comprises an accommodation portion configured to receive the conducting member while accommodating the first protruding portion and the second protruding portion.

6. The sheet conveyor device according to claim 5, further comprising a guide member comprising the first guide surface,
    wherein the accommodation portion is a recessed portion, and
    wherein the contact portion comprises a surface facing the guide member, wherein the surface is opposite to a surface that makes contact with the sheet conveyed by the conveyor.

7. The sheet conveyor device according to claim 1, wherein the conducting member comprises a ground connection portion that continues from the contact portion and is configured to be connected to a ground wire.

8. The sheet conveyor device according to claim 1, further comprising:
    a guide member comprising the first guide surface,
    a supply portion configured to receive one or more sheets to be conveyed by the conveyor,
    a separating mechanism configured to separate, one by one, the one or more sheets received by the supply portion, and
    an urging member disposed between the guide member and the separating mechanism, wherein one end of the urging member is supported at a position overlapping the conducting member of the guide member in an up-down direction, and another end of the urging member is configured to exert an urging force on the separating mechanism.

9. The sheet conveyor device according to claim 8, wherein the guide member engages both ends of the conducting member in a direction perpendicular to the conveying direction, and the conducting member is in contact with a surface of the guide member, wherein the surface of the guide member is opposite to a surface that supports the urging member of the guide member.

10. The sheet conveyor device according to claim 8, wherein the separating mechanism comprises a separation pad and a separation roller.

11. The sheet conveyor device according to claim 1, further comprising:
    a guide member comprising the first guide surface,
    a supply portion configured to receive one or more sheets to be conveyed by the conveyor,
    means for separating, one by one, the one or more sheets received by the supply portion, and
    an urging member disposed between the guide member and the separating means, wherein one end of the urging member is supported at a position overlapping the conducting member of the guide member in an up-down direction, and another end of the urging member is configured to exert an urging force to the separating means.

12. The sheet conveyor device according to claim 1, further comprising a supply portion disposed below the sheet stack portion and configured to receive one or more sheets to be conveyed by the conveyor,
    wherein the conveyance path comprises an upstream portion, a curved path portion and a downstream portion, where the conveying direction of the sheet conveyed from the supply portion makes a U-turn when the sheet is conveyed from the upstream portion through the curved path portion to the downstream portion, and wherein the ejection roller ejects the one or more sheets to the sheet stack portion successively such that the ejected sheet slides under a preceding sheet that has been ejected onto the sheet stack portion.

13. The sheet conveyor device according to claim 1, further comprising a reading unit configured to read an image on the sheet conveyed by the conveyor.

14. The sheet conveyor device according to claim 1, wherein the conducting member is a steel sheet.

15. The sheet conveyor device according to claim 1, wherein the contact portion has a substantially plate-like shape.

16. A sheet conveyor device comprising:
a conveyor configured to convey a sheet along a conveyance path in a conveying direction, the conveyor comprising an ejection roller;
a sheet stack portion configured to receive the sheet conveyed by the conveyor, the ejection roller configured to eject the sheet to the sheet stack portion;
a conducting member comprising:
a contact portion disposed along the conveyance path and downstream of the ejection roller and configured to come into contact with the sheet conveyed by the conveyor; and
a discharge portion configured to discharge static electricity that is transferred to the contact portion by contact between the sheet and the contact portion; and
a supply portion disposed below the sheet stack portion and configured to receive one or more sheets to be conveyed by the conveyor,
wherein the conveyance path comprises an upstream portion, a curved path portion and a downstream portion, where the conveying direction of the sheet conveyed from the supply portion makes a U-turn when the sheet is conveyed from the upstream portion through the curved path portion to the downstream portion, and
wherein the ejection roller ejects the one or more sheets to the sheet stack portion successively such that the ejected sheet slides under a preceding sheet that has been ejected onto the sheet stack portion.

17. The sheet conveyor device according to claim 16, wherein the conducting member is a steel sheet.

18. A sheet conveyor device comprising:
a conveyor configured to convey a sheet along a conveyance path in a conveying direction, the conveyor comprising an ejection roller;
a sheet stack portion configured to receive the sheet conveyed by the conveyor, the ejection roller configured to eject the sheet to the sheet stack portion; and
a conducting member comprising:
a contact portion disposed along the conveyance path and downstream of the ejection roller and configured to come into contact with the sheet conveyed by the conveyor;
a discharge portion configured to discharge static electricity that is transferred to the contact portion by contact between the sheet and the contact portion; and
a ground connection portion that continues from the contact portion and is configured to be connected to a ground wire.

19. The sheet conveyor device according to claim 18, further comprising:
a supply portion configured to receive one or more sheets to be conveyed by the conveyor,
a separating mechanism configured to separate, one by one, the one or more sheets received by the supply portion, and
an urging member disposed between the conducting member and the separating mechanism, wherein one end of the urging member is supported at a position overlapping the conducting member in an up-down direction, and another end of the urging member is configured to exert an urging force on the separating mechanism.

20. The sheet conveyor device according to claim 19, wherein the separating mechanism comprises a separation pad and a separation roller.

* * * * *